United States Patent [19]

Cline et al.

[11] Patent Number: 4,821,213

[45] Date of Patent: * Apr. 11, 1989

[54] SYSTEM FOR THE SIMULTANEOUS DISPLAY OF TWO OR MORE INTERNAL SURFACES WITHIN A SOLID OBJECT

[75] Inventors: Harvey E. Cline, Schenectady; Siegwalt Ludke, Scotia; William E. Lorensen, Ballston Lake, all of N.Y.

[73] Assignee: General Electric Co., Schenectady, N.Y.

[*] Notice: The portion of the term of this patent subsequent to Jan. 12, 2005 has been disclaimed.

[21] Appl. No.: 943,359

[22] Filed: Dec. 19, 1986

[51] Int. Cl.$^4$ .............................................. G06F 3/14
[52] U.S. Cl. .................................. 364/522; 378/901; 364/413.13
[58] Field of Search ................ 364/518, 521, 522, 414, 364/415, 413; 378/4, 901

[56] References Cited

U.S. PATENT DOCUMENTS

| | | | |
|---|---|---|---|
| 4,105,922 | 8/1978 | Lambert et al. | 364/414 |
| 4,117,336 | 9/1978 | Bates | 364/414 X |
| 4,641,351 | 2/1987 | Preston, Jr. | 364/414 X |
| 4,674,046 | 6/1987 | Ozeki et al. | 364/522 X |
| 4,694,404 | 9/1987 | Meagher | 364/518 |
| 4,710,876 | 12/1987 | Cline et al. | 364/414 |
| 4,719,585 | 1/1988 | Cline et al. | 364/518 |
| 4,729,098 | 3/1988 | Cline et al. | 364/414 |

OTHER PUBLICATIONS

Machover, C. and Myers, W., "Interactive Computer Graphics", *Computer Magazine*, IEEE Computer Society Publication (Oct. 1984), pp. 145-161.

Ehud Artzy et al., "The Theory, Design, Implementation and Evaluation of a Three-Dimensional Surface Detection Algorithm", *Computer Graphics and Image Processing*, vol. 15 (1981), pp. 1-24.

H. E. Cline et al., "Computer Aided Surface Reconstruction of Interference Contours", *Applied Optics*, vol. 21, No. 24, Dec. 15, 1982, pp. 4481-4488.

James D. Foley et al., "Fundamentals of Interactive Computer Graphics", Addison-Wesley Publishing Company, pp. 446-450.

J. Lawrence Paul, "Three Dimensional Display of Objects from Planar Contours", *Graphics Interface* '83, pp. 129-131.

Primary Examiner—Gary V. Harkcom
Assistant Examiner—Mark K. Zimmerman
Attorney, Agent, or Firm—Geoffrey H. Krauss; James C. Davis, Jr.; Marvin Snyder

[57] ABSTRACT

A dual pipeline architecture for a system for preprocessing image data gathered from such systems as magnetic resonance imaging and computer axial tomography scanners. In one simultaneously operable dual pipeline, normal vectors are computed for each voxel element in accordance with the dividing cubes vector generation system. In another pipeline, circuitry is provided for generating surface identification indicia which are associated with unit normal vectors produced by the former pipeline. Data are supplied to a graphics processor for the production of shaded two-dimensional images representative of three-dimensional surfaces from various view angles. The system is particularly useful in medical diagnostic applications and is particularly useful in planning surgical procedures.

5 Claims, 6 Drawing Sheets

SYSTEM FOR THE SIMULTANEOUS DISPLAY OF TWO OR MORE INTERNAL SURFACES WITHIN A SOLID OBJECT

BACKGROUND OF THE INVENTION

The present invention is generally directed to a system and method for displaying internal surface information. More particularly, the present invention is directed to a system and method for displaying internal surfaces existing at various depths within a three-dimensional body. The images of the surfaces displayed are typically contained within the interior regions of solid bodies which are examined by computer axial tomographic (CAT) x-ray systems or by nuclear magnetic resonance (NMR) imaging systems, either of which is capable of generating three-dimensional arrays of data representative of one or more physical properties at various locations within a three-dimensional object. The images generated in the practice of the present invention are particularly useful in that they provide three-dimensional data for examination by physicians, radiologists and other medical practitioners. The present invention is particularly useful in that it permits the simultaneous display of select tissue types on a display device. Even more particularly, the present invention is directed to a parallel, pipeline architecture for simultaneously determining surface type and for the generation of surface normal vectors for the display of shading characteristics.

In conventional x-ray systems, a two-dimensional shadow image is created based upon the different x-ray absorption characteristics of bone and soft tissues. A great improvement on the conventional x-ray system as a diagnostic tool is provided by computed axial tomographic systems, which have been developed over the last ten years or so. These so-called CAT systems are x-ray based and have been used to produce single two-dimensional views depicting transverse slices of a body, object or patient. Three-dimensional information was thereafter gleaned from CAT scan data by generating data for a number of contiguous slices and using the inferential abilities of the radiologist to suggest a three-dimensional representation for the various internal organs. In the present invention, shaded and contoured three-dimensional images are generated from the three-dimensional array of data generated by a sequence of such contiguous CAT scans or magnetic resonance imaging scans. The images are typically displayed on a two-dimensional screen, but the shading provided produces an illusion of a three-dimensional structure, just as in a conventional motion picture.

The newer magnetic resonance imaging technology possesses the capability to better discriminate between various tissue types, not just between bone and soft tissue and therefore offers the capability for producing more discriminating images in many situations. NMR imaging systems are also capable of generating physiological data rather than just image data. However, whether NMR or CAT systems are employed, data has generally been available only as a sequence of slices, and systems have not generally been available which provide shaded two-dimensional images which accurately depict three-dimensional views.

Prior work by at least one of the inventors herein has significantly solved some of the major problems associated with the production of high resolution, three-dimensional medical images. In particular, a system referred to as "dividing cubes" was disclosed in patent application Ser. No. 770,164 filed on Aug. 28, 1985 now U.S. Pat. No. 4,719,585, issued Jan. 12, 1988. At the time of the invention, all of the individuals in the present case and other related prior cases assigned to the same assignee, were under an obligation of assignment to the same assignee. The present application is also assigned to the same assignee.

Attention is now directed to the specific problem solved by the system of the present invention. In the display of three-dimensional images, and more particularly in the display of medical images, one often encounters three-dimensional objects having multiple interior surfaces which occur in layers at various depths. For example, three-dimensional data associated with physical measurements of the human head produce data associated with skin, bone (the skull), the brain, nasal cavities and various internal soft tissue structures. In a three-dimensional view of the head, for example, there are circumstances in which it would be desirable to be able to simultaneously display both brain and bone tissue structures. Likewise, there are situations in which it would be desirable to be able to quickly switch back and forth between views of skin and bone and/or brain tissue to reveal underlying structures and relationships between the structures. This ability is particularly useful prior to certain surgical procedures. While the dividing cubes system is capable of displaying selected tissues such as bone or skin or brain tissue, it is also nonetheless desirable to be able to display selected structures and/or to simultaneously display these structures on the screen simultaneously so as to more clearly indicate their relationship. This is particularly advantageous as a surgical planning method since it is capable of showing the relationship between various bodily structures. It is noted, however, that while the present invention is particularly directed to the medical imaging arts, there is nothing contained herein which would limit its use thereto. Any three-dimensional measurement process performed on an object having an internal structure is amenable to processing in accordance with the system of the present invention. All that is required is that measurements of physical properties be made so as to associate the physical property measurements within regularly spaced locations with the body being studied.

An image of the anatomy typically consists of the visible surfaces of tissues computed by scanning the data and projecting the surface patches onto a view plane. In a three-dimensional array of data, the volume element is called a "voxel", in analogy with that of the area element which is referred to as a "pixel" in two-dimensional situations. In certain systems, voxel size limits the resolution of three-dimensional reconstructions thereby resulting in images that appear block-like or stepped as compared to having the smooth surfaces of real tissues. Attempts to produce smoother images by averaging over neighboring voxels, however, actually tends to reduce the resolution of the images. Other methods for three-dimensional display generation of images have been based upon measurement of the distance from an imaginary observation point to a patch on the surface of the object and on the estimated surface normal of the patch.

To shade the surface of a three-dimensional image projected onto a plane, an intensity is calculated from the component of the unit normal vector which component is parallel to the view direction. Surfaces with normal vectors parallel to the view plane are fully illuminated, while those with normal vectors at oblique angles to the view plane are gray and surfaces with normal vectors perpendicular to the view plane are dark or black. The dividing cubes system estimates the surface normal direction from a gradient vector of the three-dimensional density function. This is a useful estimate since the gradient is perpendicular to surfaces of constant density. Consequently, the gradient vector is substantially parallel to the unit surface normal vector. The unit normal vector is calculated by normalizing the gradient vector at the surface of interest. In the dividing cubes system, the gradient vector defined at each lattice point is linearly or nonlinearly interpolated over the voxel to give a local value of the gradient vector at desired intermediate voxel locations. A unit surface normal is computed by dividing the gradient vector by its magnitude. The surface that results from the use of these interpolated normalized vectors appears smooth because the interpolated gradient vector continuously varies with distance across a voxel boundary. This form of gradient shading is preferably employed in the dividing cubes system in general and in the variation of the dividing cubes system.

SUMMARY OF THE INVENTION

In accordance with a preferred embodiment of the present invention, a system for the display of internal surfaces of three-dimensional objects employs comparison means for comparing signal pattern values associated with the grid locations of a parallelopiped volume element with at least two threshold values so as to generate an indicia of the relationship between each volume element and internal surface features of a body being investigated, the features being defined by said threshold values. The system also includes means for storing the three-dimensional signal patterns which are representative of the value of at least one physical property associated with a three-dimensional body at regularly spaced parallelopiped grid locations which define volume elements, or voxels, within the body. Means are provided for retrieving the signal pattern values associated with individual volume elements. For purposes of supplying appropriate information to a display processor, signal values are associated with an appropriate three-dimensional location, as determined by each grid location. In a preferred embodiment of the present invention, simultaneously operative means are provided for generating the normal vector to one side of a select surface. Each normal vector is associated with either a given original grid location or with interpolated grid locations lying within a voxel element or on surfaces defining a voxel element. Thus, the operation of normal vector generation is carried out simultaneously with the determination of surface referencing indicia. Means are also provided for associating each volume element with appropriate surface indicia references. Accordingly, the system of the present invention supplies surface indexed normal vector information to a display processor means for receiving location values, normal vectors and surface indicia references so as to provide a shaded image, the image representing at least on select surface.

Also, in accordance with a preferred embodiment of the present invention, the normal vectors are also normalized prior to supplying them to a display processor means. As used herein and in the appended claims, the terms "normal" and "normalize" possesses two distinct meanings which are well known to those skilled in the engineering arts. The use of the terms "normal" and "normalize" is nonetheless appropriate because it is used in the art and because context clearly distinguishes its two meanings. In particular, in one context, a normal vector is one which is perpendicular to another geometric object, such as a surface. In the other context, a normalized vector, is a vector which possesses unit magnitude. A normalized vector is therefore one which is produced by dividing each of its vector components by the magnitude of the vector. In generally, the magnitude of a vector is determined by the square root of the sum of the squares of its components. Thus, one can speak of a normalized normal vector which is a vector of unit magnitude perpendicular to some geometric object.

Likewise, in the present specification and the claims which depend therefrom, the term "cubically adjacent" is used to refer to that set of eight grid locations which define a parallelopiped volume element. Although some of the figures herein and the discussions associated therewith are directed to a situation in which the parallelopiped forms a cube or rectangular prism, it should nonetheless be understood that the present invention is not limited to such grid location patterns. Rather, in the present invention, any regularly spaced, parallelopiped grid location pattern may be employed for measurement of the physical parameters.

It is also noted herein that the present invention employs means for providing the three-dimensional location associated with each grid location. In this regard, it is noted that this particular aspect of the present invention may be provided simply by establishing a predefined data scanning sequence so that the pipelined, parallel processing system of the present invention and the display processor operate upon the data provided in a standard order.

Accordingly, it is seen that it is an object of the present invention to provide a system and method for the simultaneous display of two or more shaded three-dimensional images on a display device.

It is a further object of the present invention to provide a display system which is capable of rapidly selecting one or more of several surface structures for display.

Another object of the present invention is to provide a system and method for use in junction with CAT scanners, ultrasound devices, MR imaging systems and any and all other systems capable of generating three-dimensional data representative of one or more physical properties within a body to be studied.

It is yet another object of the present invention to provide a graphical system for medical image display which is capable of interactive use and yet at the same time produces high quality images providing textural shading and other visual clues to the user.

It is yet another object of the present invention to provide a three-dimensional graphics display system which is compatible with various CAD/CAM systems.

Another object of the present invention is the generation and display of three-dimensional raster format based information.

Still another object of the present invention is the generation of images specified by a three-dimensional data array for the purpose of surface representation.

It is also an object of the present invention to provide a system and method which is readily fabricatable in conventional electronic hardware.

It is a particular object of the present invention to provide a parallel pipelined architecture for the rapid generation of image information.

It is a still further object of the present invention to be able to assign surface indicia information to individual vector and voxel elements.

It is yet another object of the present invention to provide medical practitioners with the ability to more easily prepare for surgical procedures prior to undertaking invasive measures.

Additionally, it is an object of the present invention to provide a plurality of three-dimensional surface views from a single set of collected data.

It is a still further object of the present invention to provide a system and method for the display of selected internal surface structures of a three-dimensional objects.

Lastly, but not limited hereto, it is an object of the present invention to provide a system and method for the display of three-dimensional images of internal surface structures in such a way that the specific viewing angle and cross-sectional viewing plane may be selected by the user in an interactive manner.

DESCRIPTION OF THE FIGURES

The subject matter which is regarded as the invention is particularly pointed out and distinctly claimed in the concluding portion of the specification. The invention, however, both as to organization and method of practice, together with further objects and advantages thereof, may best be understood by reference to the following description taken in connection with the accompanying drawings in which:

DETAILED DESCRIPTION OF THE INVENTION

Figure 1:
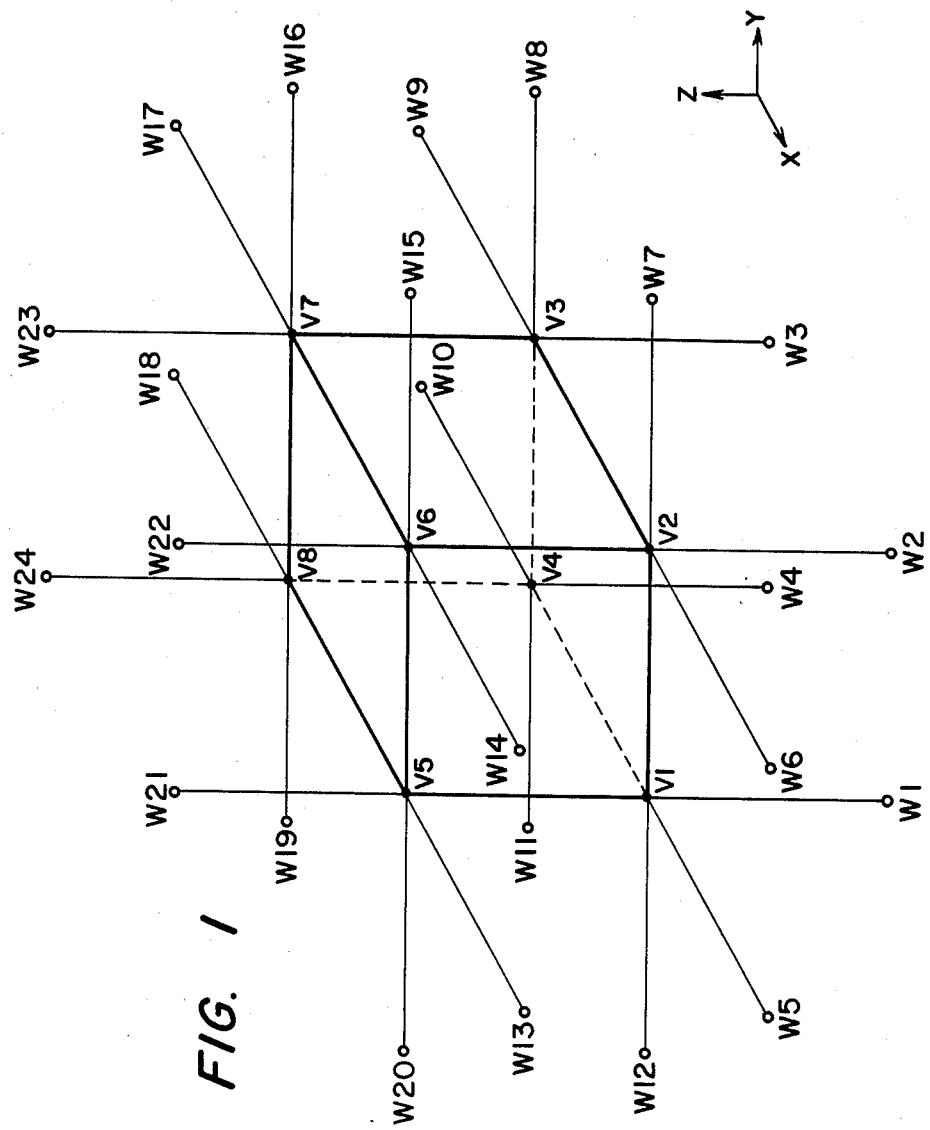
FIG. 1 is a perspective view illustrating a single voxel element defined by eight grid locations and surrounded by 24 "additional" data points (grid locations)

In the method and apparatus of the present invention, a sequence of voxel elements is examined. In a preferred embodiment of the present invention, data from four consecutive NMR or CAT scan slices is analyzed at one time. The reason for the desirability of employing four slices of data is seen in FIG. 1 which illustrates a single voxel element with vertices V1 through V8. Each voxel element naturally spans two slices of image information. Associated with each vertex point is a signal pattern value which represents a measurement of at least one physical property which is associated with a three-dimensional body at regularly spaced grid locations within the body. The grid locations define volume elements or voxels. Additionally, for the practice of the present invention, each voxel vertex V1 through V8 is also associated with three adjacent grid locations. These adjacent grid locations are the ones which lie along grid coordinate lines and which are not specifically included in the voxel itself. There are 24 such "additional data" points. For example, it is seen that vertex V1 is associated with additional grid locations W1, W5 and W12. In a similar fashion, vertex location V7 is associated with grid locations W16, W17 and W23. These other additional grid locations are shown as open circles in FIG. 1. The voxel grid locations themselves are shown as filled in circles. It is therefore seen that each voxel vertex grid location is associated with three adjacent grid locations. In FIG. 1, these additional grid locations are labeled as W1 through W24 as shown. It is therefore seen that these additional grid locations are 24 in number and occupy four data slices. In the system and method of the present invention, the data values at these additional grid locations are employed, along with the data values at the voxel vertex locations (if desired), to generate data value triplets which represent normal vectors associated with each vertex point. The various normal vector components are computed using finite difference methods. For example, a central difference may in particular be employed. More particularly, to compute the x component of the normal vector at vertex V1, data values at V4 and grid location W5 are differenced. In a like manner, the z component of the normal vector associated with vertex V1 may similarly be computed using data values at grid locations V5 and W1. Lastly, the y component of the normal vector associated with vertex V1 may be generated using a difference based on the data values associated with grid locations V2 and W12. The differences may also be scaled to reflect coordinate distance differences in the three coordinate directions. The order in which the difference is taken is naturally selected to be consistent with the orientation of some coordinate system (see axes shown) and the method is employed uniformly throughout for the other voxels. In this manner, it is seen how data from four slices is employed to generate normal vectors associated with each voxel vertex location. The resulting vector formed from differences is then scaled to unit magnitude, as is more particularly described below.

Figure 2:
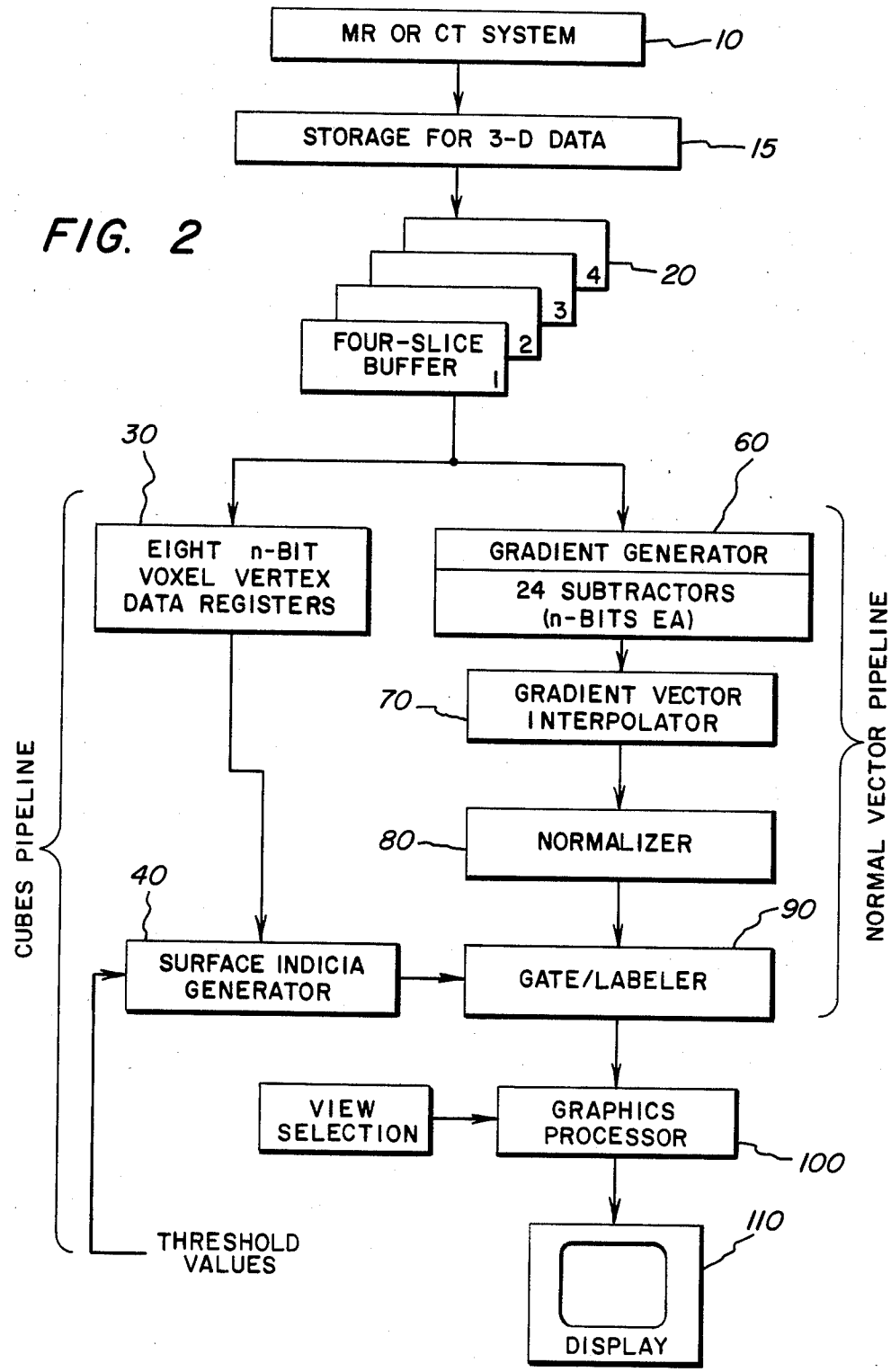
FIG. 2 is a schematic diagram illustrating a system in accordance with the present invention, and more particularly illustrating the presence of a vector pipeline and a surface indicia generation pipeline.

FIG. 2 illustrates, in schematic form, both a flow chart and hardware description of a system in accordance with the present invention. In one embodiment of the present invention, three-dimensional signal data is provided from an MR or CT scan system 10. This data is typically stored in an appropriate storage system 15. Typically this storage system comprises some form of magnetic storage medium such as a floppy disk, hard disk drive, or tape. The data is organized in a format which permits associating each physical measurement representation with a corresponding grid location associated with that measurement.

In a preferred embodiment of the present invention, four-slice buffer 20 is employed. This buffer includes layer No. 1, No. 2, No. 3 and No. 4, with each memory layer containing representations for the signal pattern values at the various grid locations. Each layer preferably contains the data for an entire two-dimensional slice of the body being imaged. A slice scanner is employed so as to scan the data from storage means 15 into 4slice buffer 20 along one of the axis directions. In a preferred embodiment of the present invention, there is a direct correlation between buffer address value and grid location within the body. It should be borne in mind that as one scans through the data in one axis direction by using buffer 20, it is only necessary to retrieve a single additional slice of information at a time. In short, the scanner can be made to operate in a fashion so that only data from a single image plane need be retrieved at one time.

In general, four signal values from one voxel face are provided from layer No. 2, and at the same time, four signal values from layer No. 3 are similarly provided to voxel vertex data register 30 and to gradient generator 60. Gradient generator 60 also receives data from the 24 "additional" data grid locations as described above and as shown in FIG. 1. Each cell in register 30 contains the corresponding physical measurement in an appropriate and consistent representational format. In this way, for each voxel element, the values associated with vertices V1 through V8 are supplied to register 30. In a like fashion, the physical measurement values associated with additional grid locations W1 through W24 are supplied to gradient generator 60 along with the physical measurement values associated with vertices V1 through V8, since all 32 pieces of information are generally required for the generation of gradient vector data. At this point, an especially useful feature of the present invention should be pointed out. In particular, it is seen that physical measurement data is simultaneously supplied to register 30 and to gradient vector generator 60. Thus, the generation of gradient vectors is performed simultaneously with the determination of surface indicia information which is later associated with resultant gradient vectors. These operations are carried out in parallel. Surface indicia generation is carried out in the "cubes pipeline" comprising register 30 and surface indicia generator 40. At the same time in the "normal vector pipeline", gradient vectors are produced by generator 60 and interpolated in functional block 70 and subsequently normalized (that is, unit vectors are generated) by functional block 80. Ultimately, surface indicia information together with normalized vector information is provided to gate/labeler 90. Functional block 90 operates to associate surface indicia information with the voxel grid locations associated with the vertex data simultaneously supplied to blocks 30 and 60. In the case that it is determined that the voxel in question does not intersect a desired surface, block 90 also preferably operates as a gate to disable supplying vectors to graphics processor 100. Graphics processor 100 comprises standard equipment of this type which receives normal vector information associated with each grid location and, depending upon the view selected, produces a shaded image on display 110, which typically comprises a cathode ray tube (CRT) type device. Functional blocks 60, 70 and 80 essentially perform the dividing cubes operations as disclosed in the aforementioned patent application.

Gradient generator 60 preferably includes 24 subtractor circuits for forming the differences described above for generating normal vector components. In general, each subtractor processes n bits of data. Each n bit signal represents a signal which is proportional to the aforementioned physical measurement. In one embodiment of the present invention, such measurements are represented by 12bit signal values. The result of these 24 subtractions is supplied to gradient vector interpolator 70 which preferably performs the dividing cubes function described in the aforementioned patent application. In particular, the 24 subtractions carried out in block 60 produce the components of 8 gradient vectors, each of which is associated with a particular voxel vertex. The grid axes are partitioned into a number of subvoxel elements and, using various interpolation methods, intermediate vector gradient approximations are produced. For example, in one form of interpolation, a simple averaging along grid axes is employed. Likewise, for interpolation points which lie on voxel faces, the average of the four face vertex gradient vectors may be generated. For interior points generated by interpolation, a weighted average of a larger number of vectors may be generated. It is also possible to generate interpolated gradient vectors which are weighted by the magnitudes of the voxel vertex data values.

Functional block 80 operates to normalize each of the interpolated vectors from interpolator 70. In particular, normalizer 80 generates the squares of the vector components, sums them and also generates the square root of the sum for each of the vectors. Each component is then divided by this magnitude to produce a unit vector. Thus normalizer 80 supplies to gate/labeler 90 a set of unit gradient vectors associated with a given voxel element. Whether or not these vectors are passed on to graphics processor 100 and if so, their surface label is determined by a signal supplied from surface indicia generator 40.

In accordance with the present invention, surface indicia generator 40 preferably operates simultaneously with normal vector generation to determine two things. First, it is determined whether or not a given voxel element intersects surfaces defined by threshold values. Secondly, if voxel intersection is indicated, an indicia is generated to indicate which surface is intersected.

Figure 3:
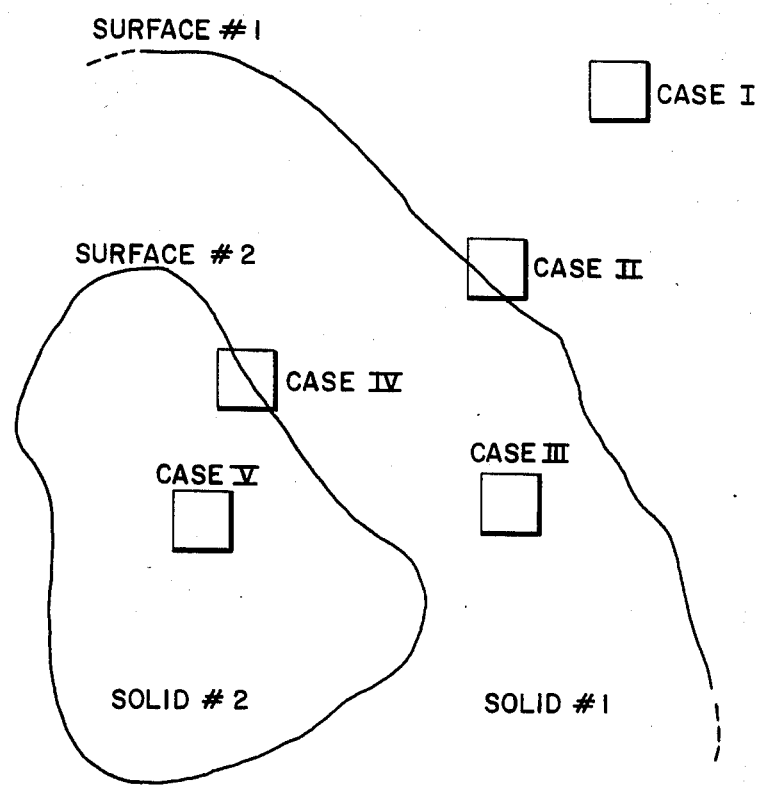
FIG. 3 is a schematic diagram illustrating, in two dimensions, the various cases that arise with respect to voxel intersection and various nested surface structures.

One of the functions performed by surface indicia generator 40 is the classification of voxel intersection with internal surface structures. In particular, FIG. 3 illustrates, for an analogous two-dimensional situation, the various ways that a voxel element may intersect two surfaces. In case I, the voxel element does not intersect the outer surface at all. In case II, surface No. 1 passes through the voxel element. In case III, the voxel element lies between surface No. 1 and surface No. 2. In many cases, the region between surface No. 1 and surface No. 2 is actually the region of a solid object, such as bone. As used herein, the term "solid" in FIGS. 3–6 does not mean to suggest that any particular tissue type is present and in fact, a "solid" region might represent the interior of a sinus cavity, for example. Similarly, case IV illustrates a situation in which a voxel element intersects a second interior surface. Similarly, case V represents the situation in which a voxel element lies inside of surface No. 1 and also inside surface No. 2 so as to be present in a second interior solid. This situation is generalized in FIG. 5, discussed below.

Figure 4:
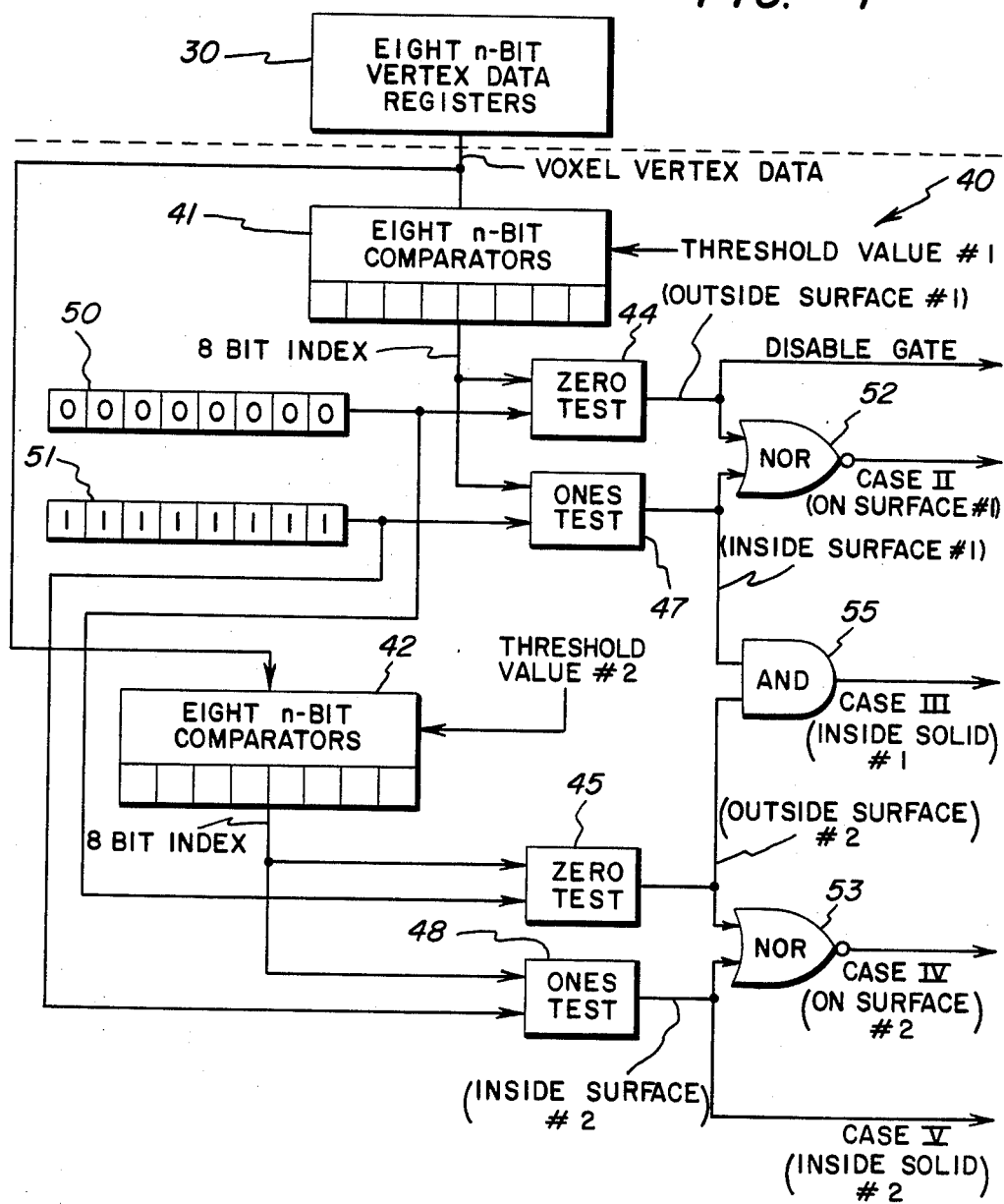
FIG. 4 is a schematic diagram more particularly illustrating surface indicia generation means, particularly for the case in which up to two surface indicia are generated.

A system for determining whether or not a given voxel element represents cases I through V is shown in FIG. 4. In particular, vertex data values from a given voxel element, having been stored in registers 30 are supplied to comparators 41 and 42. Comparator 41 preferably comprises eight n-bit comparators which compare each of the voxel vertex signal pattern values with a threshold value which is generally selected by the operator to pick out particular tissues. For example, a different threshold value is selected for bone tissue as opposed to cerebral tissue. Each of the eight vertex values is compared with the threshold value and in each case, a single bit is generated to indicate whether or not the threshold value is exceeded. The result of this operation, carried out by comparators 41 and 42, is an eight-bit index. Comparator 41 produces an eight-bit index based upon threshold value No. 1; comparator 42 produces an eight-bit index based upon threshold value No. 2. With specific attention being directed to the output of comparator 41, it is seen that the eight-bit index is applied to "ALL ZERO" test circuit 44 and simultaneously to "ALL ONES" test circuit 47. If the eight-bit index is all zeroes, then the output of circuit 44 is a one which indicates that the voxel element is outside of surface No. 1. In order to carry out this objective, zero values may be supplied to zero test circuit 44 from zero register 50 or its equivalent. In the same manner, ones test circuit 47 produces an output which is a binary one if the eight-bit index from comparator 41 comprises all ones. This is indicative of the voxel element being inside surface No. 1. If the voxel element is neither inside surface No. 1 nor outside surface No. 1, then it must therefore lie on surface No. 1 so that NOR gate 52 produces a "1" output in the event that the voxel element straddles surface No. 1.

In an almost identical fashion, comparator 42 produces an eight bit index comparison based on threshold value No. 2. This eight bit index is applied to zero test circuit 45 and to ones test circuit 48. Zero test circuits 44 and 45 are supplied with a constant zero value from zero register 50 or its equivalent. Likewise, ones test circuits 47 and 48 may be similarly supplied by a ones constant value from ones register 51. Zero test circuit 45 produces a binary "1" output whenever the voxel element is outside of surface No. 2. Similarly, if the voxel element lies inside surface No. 2, the output of ones test circuit 48 is a one. If the voxel is neither outside surface 2 nor inside surface 2, then it must straddle surface 2. Accordingly, NOR gate 53 produces a binary "1" output in the event that the voxel element is positioned as shown in case IV. Additionally, it is seen that if the voxel element is inside surface No. 1 and outside surface No. 2, then the voxel element is actually within solid No. 2 and case III holds. In this fashion, surface indicia are generated indicating, for each voxel element, a surface upon which the voxel lies, if any. The surface indicia generator 40 also preferably supplies a "disable gate" signal from zero test circuit 44 to gate/labeler 90 in the event that the voxel element being processed is not associated with any of the surfaces being selected for viewing.

Figure 5:
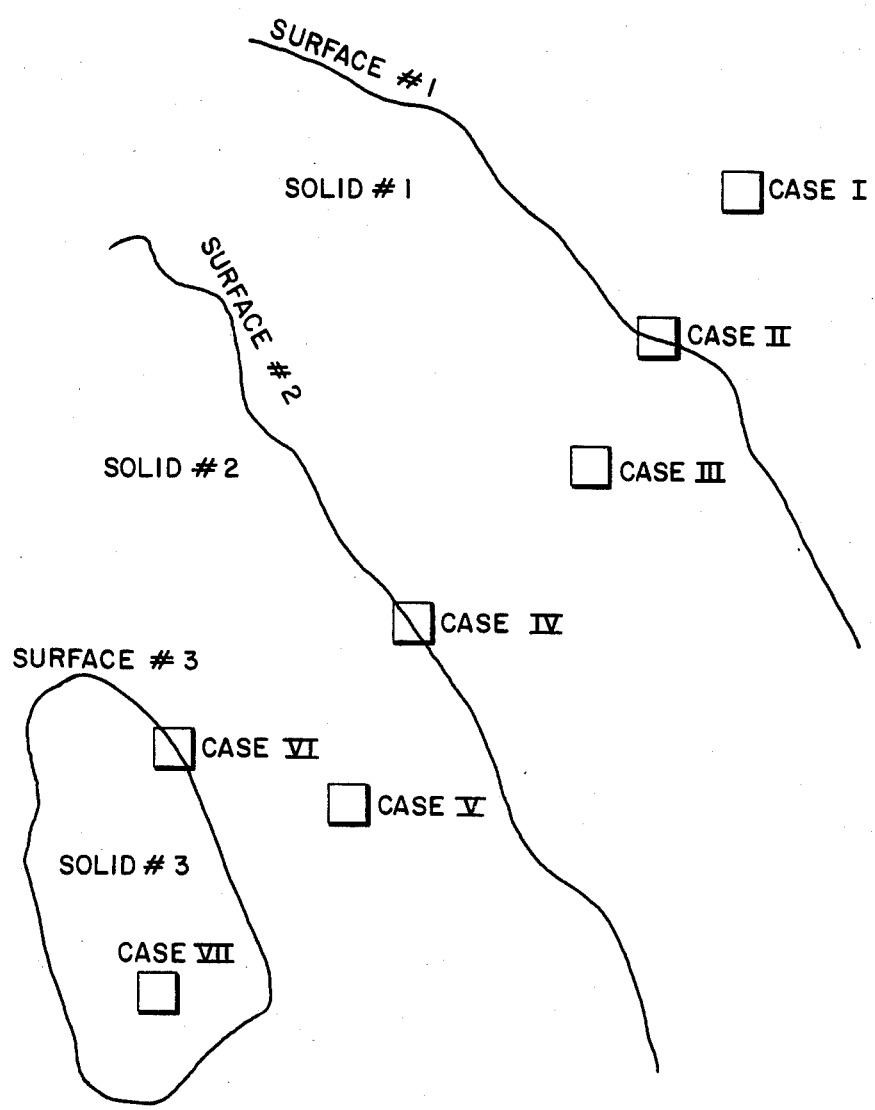
FIG. 5 is similar to FIG. 3 but more particularly illustrates the situation in which three nested surfaces are present.
Figure 6:
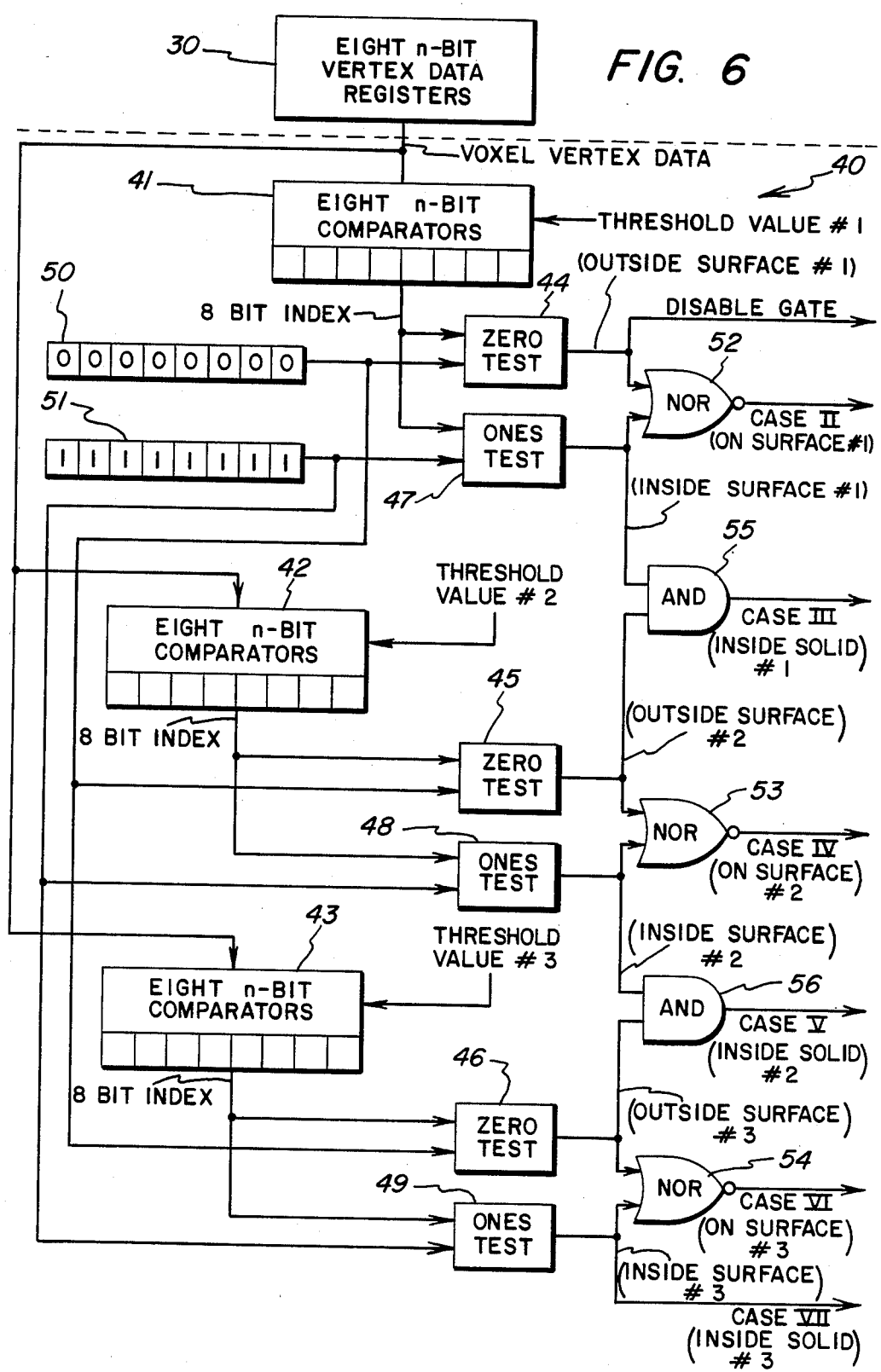
FIG. 6 is a schematic diagram illustrating a surface indicia generator for the case structure illustrated in FIG. 5.

The concepts presented in the discussions above, may be readily extended to the case in which an additional surface, surface No. 3, is present. In this situation, cases VI and VII, as shown in FIG. 5, are also present. It is seen that surface No. 3 is selected by means of a third threshold value which may be supplied to a third comparator 43, as shown in FIG. 6. FIG. 6 is readily seen as a logical extension of FIG. 4 to the situation in which one additional surface is present. The extension of FIG. 6 to even more surfaces for selection is readily accomplished simply by adding additional sets of eight n bit comparators. Each such comparator is associated with a zero test circuit and a one test circuit, such as shown in blocks 46 and 49 of FIG. 6. NOR gates are employed in each such extension to generate indicia which are indicative of the fact that the voxel being processed lies on a certain surface. Likewise, AND gates may be employed, as shown in FIG. 6, to indicate that a selected voxel element lies strictly between two internal surfaces. These surface indicia are associated with appropriate voxel elements in gate/labeler 90. This enables graphic processor 100 to selectively display one or more of the surfaces, as selected by the user. Naturally, as with many graphics processors, the user is also permitted to select a particular view direction. It is understood that problems similar to hidden line removal and/or the problem of determining visible surfaces are in fact problems solved by conventional graphics processing systems. In this respect then the system of the present invention may be thought of as a graphic preprocessor.

From the above, it should be appreciated that the display system of the present invention provides several significant advantages. In particular, the system of the present invention offers significant speed advantages as a result of the parallel computations associated with surface indicia generation which are carried out at the same time as unit normal vector generation for each voxel element. It should also be appreciated that the system of the present invention also provides a means for associating surface indicia with various data generated for each voxel element. This enables the rapid and simultaneous display of selected tissue structures. It also permits rapid switching of the view between various structural overlays so as to provide the user with a more detailed pictorial representation of internal bodily structures and their relationships.

It is noted that while the description of the present invention provided above is expressed in terms of "positive" logic quantities, that it is also possible to express the logical relationships involved in the present invention using alternative logical variables. In particular, "negative" logic variables may be employed in various parts of the present invention with only minor modifications. It is also pointed out that logically equivalent functional blocks may also be employed particularly in the case of the NOR gates and the AND gates, again particularly if "negative" logical variables are employed. It is also noted that the system described herein has expressed tissue selection in terms of whether or not a given measured physical quantity exceeds a specified threshold value. Still in keeping with the present invention, it is also possible to select tissue types based upon other criteria particularly based upon whether or not a given measured physical parameter lies between two expressed values, rather than merely just exceeds one of them. Accordingly, the description above and the appended claims are intended to include this situation through the use of the thresholding descriptions. Additionally, it is noted that the description herein has been directed to a hardware specific implementation of the present invention. Nonetheless, the various means recited in the present invention may in fact be implemented and carried out upon one or more digital computer processing elements which have been programmed in accordance with the instructions provided in the present description. Accordingly, such means for carrying out the practice of the present invention are specifically contemplated herein.

While the invention has been described in detail herein in accord with certain preferred embodiments thereof, many modifications and changes therein may be effected by those skilled in the art. Accordingly, it is intended by the appended claims to cover all such modifications and changes as fall within the true spirit and scope of the invention.

The invention claimed is:

1. A system for displaying three-dimensional surface structures, said system comprising:
   means for storing three-dimensional signal patterns representative of a value of at least one physical property of a three-dimensional body at each of regularly spaced parallelopiped grid locations each defining a volume element within said body;
   means for retrieving signal pattern values associated with said parallelopiped volume elements;
   means for comparing signal pattern values associated with a volume element with at least two threshold values, to generate an indicia of the relationship between each volume element and internal surface features of said body as defined by said threshold values;
   means for generating a normal vector to one side at said surface at each of said grid locations;
   means for associating a three-dimensional location of each of said grid locations with said normal vector generated for the surface at that grid location;
   means for associating said volume element surface indicia with said normal vectors; and
   display processor means for receiving said locations and said normal vectors and providing a shaded image, said image representing at least one select surface.

2. The system of claim 1 in which said comparing means and said normal generating means for simultaneously operable.

3. The system of claim 1 further including means for generating, for each of said normal vectors, a square root of a sum of the squares of the different directional components of that vector.

4. The system of claim 1 in which said comparing means includes a plurality of sets of eight comparators, each set receiving signal pattern values associated with cubically-adjacent volume elements and generating an eight bit binary index by comparison of each signal pattern value with threshold values supplied to that one of said comparator sets.

5. The system of claim 4 further including means for testing the eight bit binary indices to determine those volume locations for which said indices are not all zero or not all one.

* * * * *